United States Patent Office 3,333,091
Patented July 25, 1967

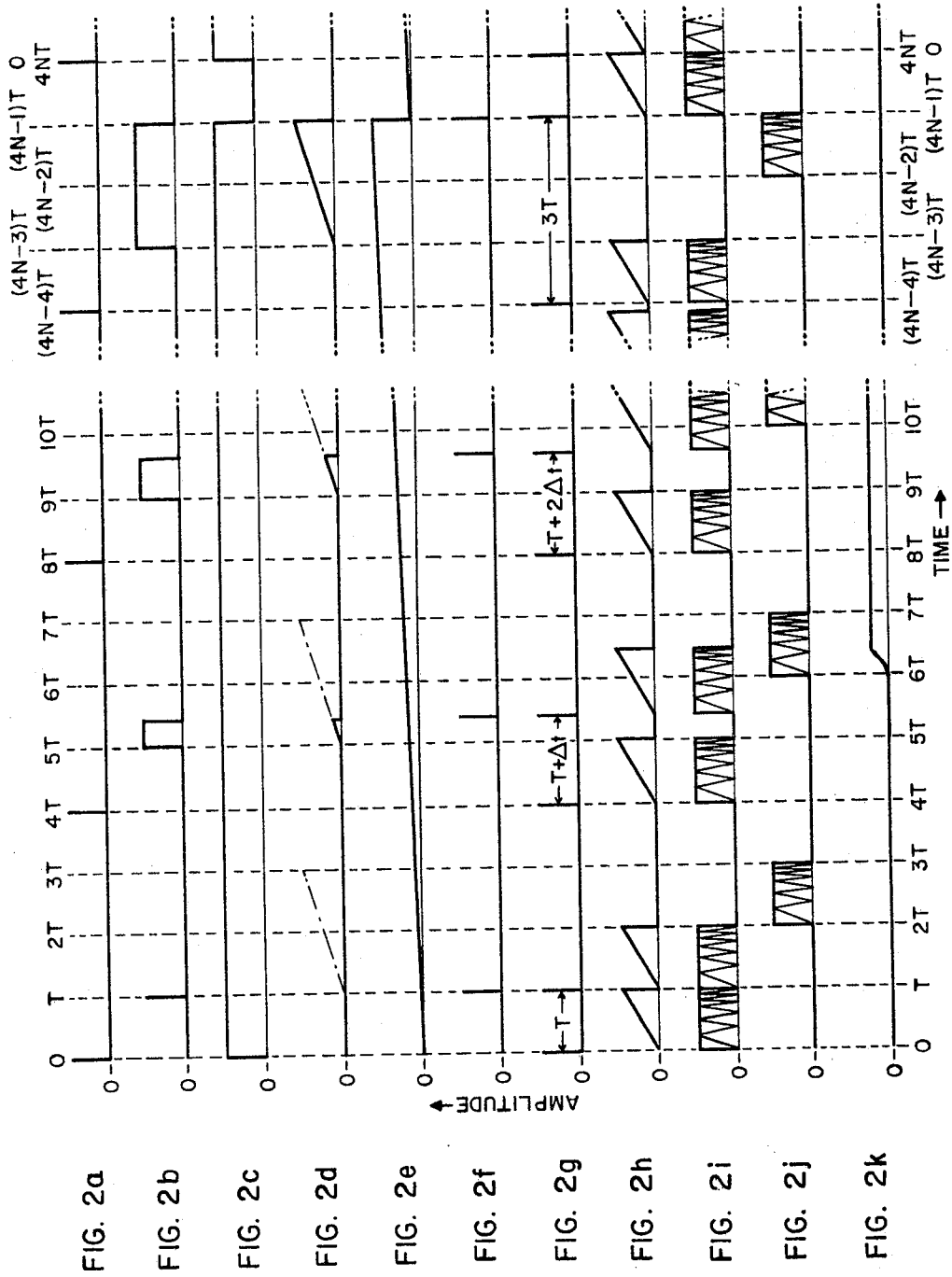

3,333,091
CORRELATION FUNCTION GENERATOR WITH MEANS FOR GENERATING A SERIES OF PAIRS OF PULSES HAVING PROGRESSIVELY DIFFERENT TIME SPACING BETWEEN THE PULSES IN EACH PAIR
Raymond J. Masak, East Northport, N.Y., assignor to Hazeltine Research, Inc., a corporation of Illinois
Filed Nov. 22, 1963, Ser. No. 325,730
10 Claims. (Cl. 235—181)

ABSTRACT OF THE DISCLOSURE

A correlation function generator which does not use variable delay lines and which requires only a single function signal generator. A series of pulse pairs having progressively different time spacing between pulses in each pair are generated and applied to a function signal generator where a corresponding series of pairs of function signals are produced. One function signal from each pair is delayed by a predetermined fixed amount before the delayed function signal and the other function signal of each pair are correlated to produce an output signal representative of the correlation function of the paired function signals, which output signal may then be displayed in visual form. Cross-correlation is provided by appropriate shifting of the frequency band encompassed by one or both function signals in each pair.

---

The present invention relates in general to apparatus for generating the correlation function of two given signals. More particularly, the present invention relates to correlation function generators of simplified design and construction which are capable of producing both autocorrelation and cross-correlation functions.

The art of generating correlation functions for various signals is generally well known. Basically, the process consists of applying two signals, which are to be correlated, to inputs of a conventional correlator. The correlator then multiplies the two input signals, takes a time average of the resulting product, and presents this time average in the form of an output signal. The output signal from the correlator is then representative of the correlation function of the two input signals. A more detailed description of this correlation process, including definitions of pertinent terms such as autocorrelation and cross-correlation, may be found in Sections 7–13 and 7–14 of the book entitled, "Information Transmisison, Modulation and Noise," by Mischa Schwartz, McGraw-Hill, 1959.

Prior correlation function generators, for example, have employed two identical signal generators driven in synchronism, each producing the same signal whose correlation properties are to be investigated. The output of one signal generator is coupled directly to one input of a conventional correlator. The output of the second signal generator is coupled to a variable delay line, which in turn has its output coupled to a second input of the correlator. Thus, by varying the amount of delay introduced by the variable delay line, correlation may be effected over the entire length of the generated signals. Obviously, however, there is redundancy in this type of system in that two identical signal generators are required. In addition, the use of a variable delay line introduces a host of technical problems and inherent inaccuracies into the system described above.

It is therefore an object of the present invention to provide new and improved correlation function generators which are not subject to the disadvantages and limitations of prior such apparatus.

It is another object of the present invention to provide new and improved correlation function generators which are capable of producing both autocorrelation and cross-correlation functions.

It is still another object of the present invention to provide new and improved correlation function generators which are capable of displaying the generated correlation functions in visual form.

In accordance with the present invention a correlation function generator comprises means for generating a series of pairs of pulses having progressively different time spacing between the pulses in each pair. The correlation function generator also comprises means responsive to said pairs of pulses for producing a corresponding series of pairs of function signals to be correlated. Furthermore, the correlation function generator comprises means for delaying one function signal from each of said pairs of function signals by a predetermined amount; and means for correlating, pair by pair, said delayed function signals with the other function signals of each pair to produce an output signal representative of the correlation function of said paired function signals.

For a better understanding of the present invention, together with other and further objects thereof, reference is had to the following description, taken in connection with the accompanying drawings, and its scope will be pointed out in the appended claims.

Referring to the drawings:

FIGS. 2a through 2k are signal diagrams useful in explaining the operation of the correlation function generator of FIG. 1.

Figure 1:
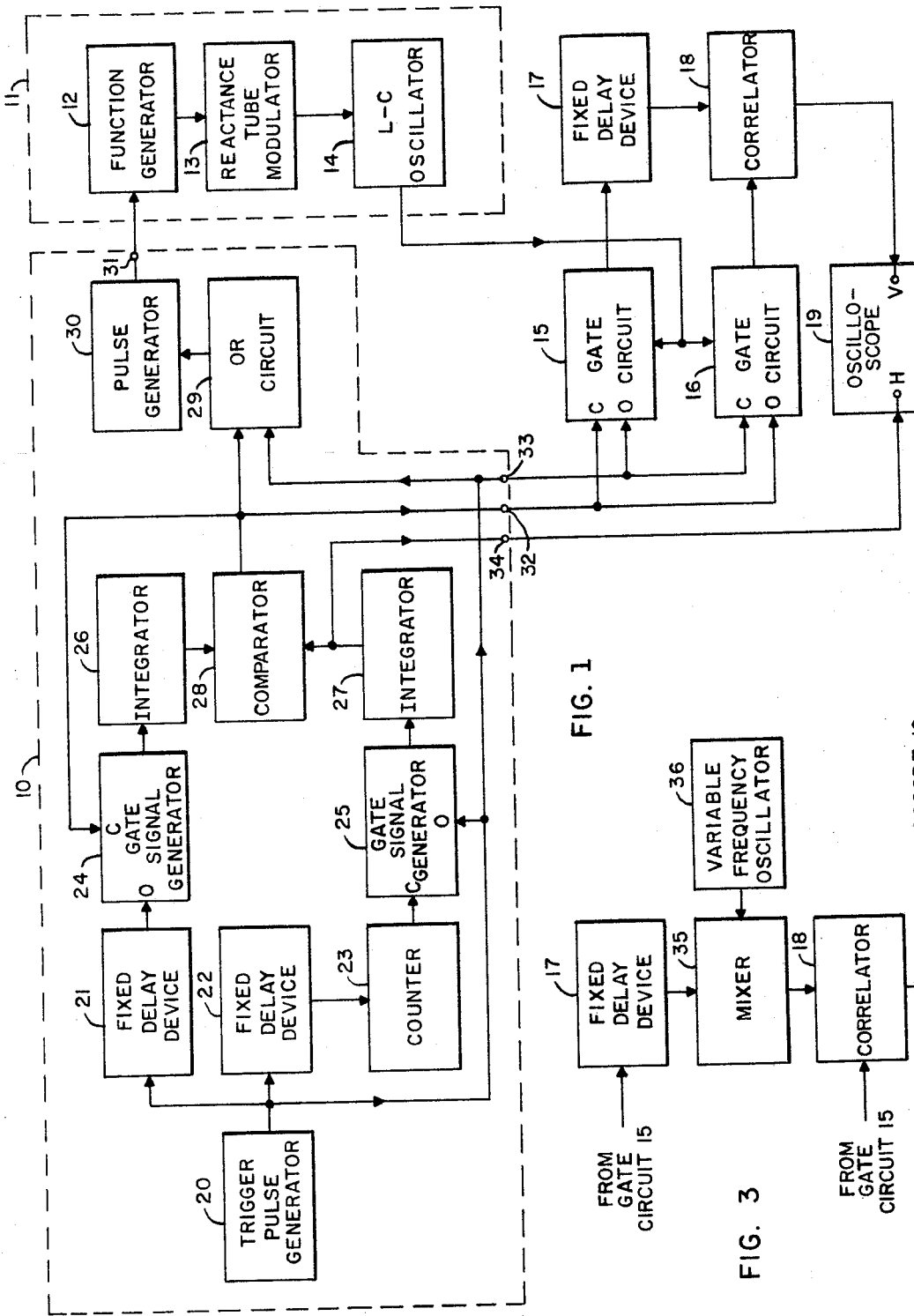
FIG. 1 is a block diagram of a correlation function generator constructed in accordance with one form of the present invention.

In FIG. 1 of the drawings there is shown a correlation function generator which includes a dual pulse generator 10 for generating a series of pairs of pulses having progressively different time spacing between pulses in each pair. It will be noted that the particular configuration of dual pulse generator 10 shown in FIG. 1 is set forth solely as an example of suitable dual pulse generator construction.

The correlation function generator of FIG. 1 also includes a signal generator 11 coupled to an output of dual pulse generator 10 for producing a corresponding series of pairs of function signals to be correlated. The particular construction of signal generator 11 is dependent upon the type of function signal one wishes to investigate the correlation properties of. In the particular embodiment of the present invention shown in FIG. 1, signal generator 11 includes a function generator 12, a conventional reactance tube modulator 13 and a conventional L-C oscillator 14, coupled together serially in the order named, with the input to function generator 12 and the output from oscillator 14 being respectively the input and output of signal generator 11. It will be assumed, for the purpose of this description, that function generator 12 is a conventional ramp generator which produces linear ramp signals having a duration [T] as shown in the signal diagram of FIG. 2h. In this case the signals appearing at the output of signal generator 11 will have a frequency modulation which is linearly increasing, and a duration equal to [T] as shown in FIG. 2i. It will be obvious to those skilled in the art that signal generator 11 may take other forms depending on the output signal desired. For example, signal generator 11 may be modified to produce output signals of the type used in the fields of sonar or pulse communication, or any other type signal which it is desired to investigate the correlation properties of.

The correlation function generator of FIG. 1 further includes the combination of first and second gate circuits 15 and 16, respectively, and fixed delay device 17, all of conventional design and construction, for delaying one function signal from each of said pairs of function signals by a predetermined amount.

The correlation function generator of FIG. 1 finally includes a conventional correlator 18, for correlating, pair by pair, the delayed function signals with the other function signals of each pair to produce an output signal representative of the correlation function of the paired function signals.

The correlation function generator of FIG. 1 also includes, as an optional unit, a conventional oscilloscope 19 responsive to the output signal of correlator 18 for displaying the correlation function represented thereby.

Dual pulse generator 10 in FIG. 1, includes a trigger pulse generator 20 which produces a continuous train of short duration pulses at a predetermined repetition rate, for example 2500 pulses per second, as shown in FIG. 2a. Trigger pulses from generator 20 are jointly supplied to a first fixed delay device 21, a second fixed delay device 22, a second gate signal generator 25, an OR circuit 29 and an output terminal 33, which units are all included in dual pulse generator 10.

Trigger pulses supplied to OR circuit 29 are passed on to a pulse generator 30, which is also included in dual pulse generator 10 and which respond by producing corresponding output pulses at output terminal 31 of dual pulse generator 10. These output pulses are the first, or reference, pulses of pulse pairs generated by dual pulse generator 10.

Trigger pulses supplied to first fixed delay device 21 are delayed by an amount of time equal to [T], for example 100 micro-seconds ($\mu$sec.), which is also the duration of the signals produced by signal generator 11 of FIG. 1. The delayed trigger pulses appearing at the output of fixed delay device 21 are then supplied to the "OPEN," designated in FIG. 1 by the symbol "O," input of a first gate signal generator 24, which is included in dual pulse generator 10. Pulses thus supplied to first gate signal generator 24 serve to initiate the generation of rectangular gate signals, as shown in FIG. 2b. A gate signal is initiated each time a delayed trigger pulse is supplied to the "OPEN" input of first gate signal generator 24 if that gate signal generator was previously closed by a signal applied to its "CLOSE," designated in FIG. 1 by the symbol "c," input from the output of a comparator 28, included in dual pulse generator 10.

The rectangular gate signals produced by first gate signal generator 24 are applied to a first integrator 26 in dual pulse generator 10, where each is integrated to form a ramp function, as shown in FIG. 2d. The ramp functions thus produced by first integrator 26 have a maximum duration equivalent to one half cycle of the signal produced by trigger generator 19, as shown in FIG. 2d, and applied to an input of comparator 28.

Trigger pulses supplied to second fixed delay device 22 are delayed by an amount of time equal to [3T], for example 300 $\mu$sec. The delayed trigger pulses appearing at the output of second fixed delay device 22 are then supplied to the input of a counter 23, which is included in dual pulse generator 10.

The delayed trigger pulses supplied to counter 23 from second fixed delay device 22 are counted, and an output pulse is generated by counter 23 each time a preset count [N] is reached. Each time counter 23 generates an output pulse it also resets itself and begins counting over again. This feature controls the cycle time of dual pulse generator 10, or in other words, the amount of time required for dual pulse generator 10 to complete its cycle of operation once, as shown in FIG. 2g. The utility of this feature will become more apparent as this description progresses.

The output pulses from counter 23 are supplied to the "CLOSE" input of second gate signal generator 25. Since second gate signal generator 25 is activated by trigger pulses from trigger pulse generator 20 being applied to its "OPEN" input, second gate signal generator 25 will produce one gate signal for each cycle of operation of counter 23, and therefore also for each cycle of operation of dual pulse generator 10, as shown in FIG. 2c.

The gate signals produced by second gate signal generator 25 are applied to a second integrator 27, which is also included in dual pulse generator 10, where each is integrated to form a ramp function, as shown in FIG. 2e. The ramp function produced by second integrator 27 has a duration equivalent to the cycle time of dual pulse generator 10, as shown in FIG. 2e, and is applied to the remaining input of comparator 28, and also to output terminal 32 of dual pulse generator 10.

Comparator 28 compares the ramp functions supplied to it by first and second integrators 26 and 27, as shown in FIGS. 2d and 2e, respectively. Each time the ramp function from first integrator 26 reaches the value of the ramp function from second integrator 27, an output pulse is produced by comparator 28, as shown in FIG. 2f. This output pulse serves three functions. First, it is applied to the "CLOSE" input of first gate signal generator 24 in order to reset the operation of that gate signal generator. Second, it is jointly applied to the "CLOSE" input of first gate circuit 15 and the "OPEN" input of second gate circuit 16, in the correlation function generator of FIG. 1, in order to close first gate circuit 15 and open second gate circuit 16, respectively. Third, it is applied to an input of OR circuit 29, where it is passed on to pulse generator 30, which responds by producing an output pulse at output terminal 31 of dual pulse generator 10. This output pulse from terminal 31 of dual pulse generator 10 is the second, or variable, pulse of a pulse pair.

Thus it will be seen that there is a progressive cycle of operation within dual pulse generator 10. Initially, first gate signal generator 24 causes a short duration ramp function, from first integrator 26, to be compared with a longer duration ramp function, from second integrator 27, in comparator 28. When the amplitude of the short duration ramp function compares with that of the longer duration ramp function, an output pulse is generated by comparator 28 which is used to reset first gate signal generator 24. Upon being reset, the next delayed trigger pulse will cause first gate signal generator 24 to begin another cycle of operation. During this next cycle of operation it will take a longer amount of time for the short duration ramp function to reach the new higher value to which the longer duration ramp function has risen since the previous cycle. Hence, the second pair of pulses produced by dual pulse generator 10 will have a time separation which is a determinable increment of time, ($\Delta t$), longer than the separation of the pulses in the first pulse pair. Since the time separation of the first pulse pair is [T], then the time separation of the second pulse pair will be [$T+(\Delta t)$]. This progressive cycle will continue to increase the time separation between pulses in successive pulse pairs until the longer duration ramp function is terminated by the closing of second gate generator 25, as shown in FIG. 2e.

The length of the longer duration ramp function, and therefore the number of pulse pairs and maximum separation between pulses in the final pulse pair, is determined by the setting of counter 23. This is so, due to the fact that the output pulse from counter 23, which is produced when counter 23 reaches a preset count [N], closes second gate signal generator 25. Thus, by adjusting the setting of counter 23, the number and maximum time separation of pulse pairs generated by dual pulse generator 10, during one cycle of its operation, may be controlled.

Turning now to the operation of the correlation function generator of FIG. 1, one cycle of operation will be described and reference will again be made to the signal diagrams of FIGS. 2a through 2k.

Operation of the correlation function generator of FIG.

1 is initiated by activating dual pulse generator 10. This results in a control signal being applied to the "CLOSE" input of second gate circuit 16, and also to the "OPEN" input of first gate circuit 15 from output terminal 33 of dual pulse generator 10. Dual pulse generator 10 also supplies a first pair of pulses, with spacing [T] between the two pulses of the first pair, to function generator 12 from output terminal 30, as shown in FIG. 2g. Function generator 12 responds to each pulse of the first pair by generating a corresponding ramp signal having a duration equal to [T], as shown in FIG. 2h. The output signal from function generator 12 is then applied to reactance tube modulator 13, which serves to frequency modulate the carrier produced by L-C oscillator 14 in accordance with the modulating ramp function produced by function generator 12. Thus, at the output of L-C oscillator 14, which is also the output of signal generator 11, a pair of frequency modulated function signals are produced which have linear frequency modulation, as shown in FIG. 2i. This first pair of function signals from signal generator 11 correspond, in time separation [T], to the first pair of pulses produced by dual pulse generator 10, as can be seen in FIGS. 2g and 2i.

The output of signal generator 11 is applied jointly to first gate circuit 15 and to second gate circuit 16. Since first gate circuit 15 is open and second gate circuit 16 is closed at the time the first frequency modulated function signal appears at the output of signal generator 11, that function signal passes through first gate circuit 15 and is applied to fixed delay device 17. Coincidently with the application of the second pulse in the first pulse pair to signal generator 11 by dual pulse generator 10, a control signal is also applied to the "CLOSE" input of first gate circuit 15 and to the "OPEN" input of second gate circuit 16 from output terminal 32 of dual pulse generator 10. Thus the second frequency modulated function signal to appear at the output of signal generator 11 passes through the open gate of second gating circuit 16 and is applied to an input of correlator 18.

The second ferquency modulated function signal of the first pair, therefore, is applied to correlator 16 at a time approximately equal to [T] and has a duration equal to [T] as shown in FIG. 2i. The first frequency modulated function signal, after being delayed by [2T] in fixed delay device 17, is applied to another input of correlator 18 at time [2T], as shown in FIG. 2j, and also has a duration equal to [T]]. The two function signals corresponding to the pulses in the first pulse pair produced by dual pulse generator 10 are thus correlated and a signal representing the resulting correlation is presented at the output of correlator 18, as shown in FIG. 2k.

This identical cycle then repeats for each succeeding pulse pair produced by dual pulse generator 10. However, since the time separation between pulses in each successive pulse pair increases, the result is that the function signal from fixed delay device 17 is correlated with more and more of the function signal from second gate circuit 16, as shown in FIGS. 2i and 2j. This process continues until the final pulse pair has been generated with a maximum time separation of [3T]. At this point the function signal from fixed delay device 17 and the function signal from second gate circuit 16 have been correlated over their entire lengths, as shown in FIGS. 2i and 2j. Thus it will be seen that for each cycle of operation of the correlation function generator of FIG. 1, correlator 18 produces a series of output signals equal in number to the number of pulse pairs generated by dual pulse generator 10. Each of these output signals of correlator 18 is representative in part of the correlation function of the signals produced by signal generator 11. The output signals from correlator 18 taken collectively for one cycle of operation represent the correlation function, or more specifically, in the present example represent the autocorrelation function of the function signals produced by signal generator 11 and are displayed in visual form by being applied to the vertical deflection input of an oscilloscope 19.

The resulting correlation function is displayed in visual form by applying the output signals from correlator 18, to the vertical deflection input of an oscilloscope 19. The horizontal deflection system of oscilloscope 19 may be swept internally at a rate corresponding to the cycle time of dual pulse generator 10, or externally, for example, by connecting the horizontal deflection input of oscilloscope 19 to output terminal 33 of dual pulse generator 10. Thus, the resulting correlation function produced by correlator 18 is presented in visual form on the face of oscilloscope 19.

Figure 3:
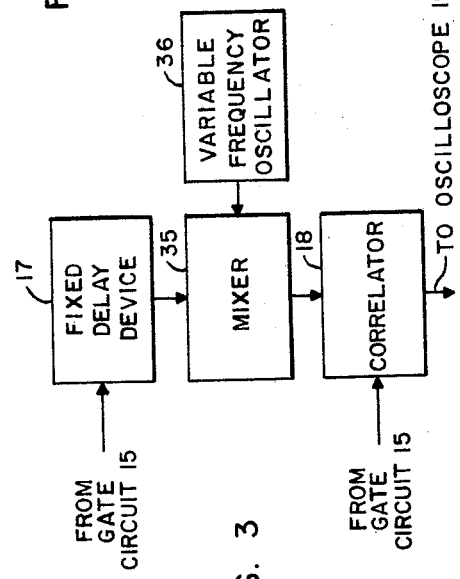
FIG. 3 is a block diagram of another form of a correlation function generator constructed in accordance with the present invention.

Another form of the correlation function generator of FIG. 1 which permits cross-correlation functions to be generated and displayed is shown in FIG. 3. To accomplish this, one of the signals in each pair generated by signal generator 11, for example the first, or reference, signal, has the band of frequencies it encompasses offset, or shifted, to a different predetermined frequency band by mixing with a variable frequency source, which in the present example is variable frequency oscillator 36, in a mixer 35. This permits cross-correlation functions to be obtained over the entire bandwidth of the correlating signals. It will be obvious that the same results may be obtained by frequency offsetting the second, or variable, output signals from signal generator 11 rather than the first, or reference, signals as described above.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:
1. A correlation function generator, comprising:
means for generating a series of pairs of pulses having progressively different time spacing between pulses in each pair;
means, including only a single function signal generator, responsive to said pairs of pulses for producing a corresponding series of pairs of function signals to be correlated;
means for delaying one function signal from each of said pairs of function signals by a predetermined fixed amount;
and means for correlating, pair by pair, the delayed function signal and the other function signal of each pair to produce an output signal representative of the correlation function of said paired function signals.
2. A correlation function generator, comprising:
means for generating a series of pairs of pulses wherein a first pulse in each pair is a reference pulse and a second pulse in each pair is a variable pulse, said series of pairs of pulses having progressively different time spacing between the reference and variable pulses in each pair;
means, including only a single function signal generator, responsive to said pairs of pulses for producing a corresponding series of pairs of function signals to be correlated;
means for delaying one function signal from each of said pairs of function signals by a predetermined fixed amount;
and means for correlating, pair by pair, the delayed function signal and the other function signal of each pair to produce an output signal representative of the correlation function of said paired function signals.
3. A correlation function generator in accordance with claim 1 wherein there is additionally included means responsive to said output signal for displaying said correlation function in visual form.

4. A correlation function generator in accordance with claim 1 wherein there is additionally included means for shifting the band of frequencies encompassed by each of said delayed function signals to a different predetermined frequency band, and wherein said correlating means correlates the delayed frequency shifted function signal and the other function signal of each pair to produce an output signal representative of the correlation function of said paired function signals.

5. A correlation function generator in accordance with claim 1 wherein there is additionally included means for shifting the band of frequencies encompassed by each of those function signals which are undelayed to a different predetermined frequency band, and wherein said correlating means correlates the delayed function signal and the other frequency shifted function signal of each pair to produce an output signal representative of the correlation function of said paired function signals.

6. A correlation function generator in accordance with claim 2 wherein there is additionally included means responsive to said output signal for displaying said correlation function in visual form.

7. A correlation function generator in accordance with claim 2 wherein there is additionally included means for shifting the band of frequencies encompassed by each of said delayed function signals to a different predetermined frequency band, and wherein said correlating means correlates the delay frequency shifted function signal and the other function signal of each pair to produce an output signal representative of the correlation function of said paired function signals.

8. A correlation function generator in accordance with claim 2 wherein there is additionally included means for shifting the band of frequencies encompassed by each of those function signals which are undelayed to a different predetermined frequency band, and wherein said correlating means correlates the delayed function signal and the other frequency shifted function signal of each pair to produce an output signal representative of the correlation function of said paired function signals.

9. A correlation function generator, comprising:
means for generating a series of pairs of pulses having progressively different time spacing between pulses in each pair, and for presenting said pulse pairs serially at a first output terminal;
means, coupled to said first output terminal and including only a single function signal generator, responsive to said pairs of pulses for producing a corresponding series of pairs of function signals to be correlated and for presenting said function signal pairs serially at a second output terminal;
means coupled to said second output terminal for delaying one function signal from each of said pairs of function signals by a predetermined fixed amount;
and means for correlating, pair by pair, the delayed function signal and the other function signal of each pair to produce an output signal representative of the correlation function of said paired function signals.

10. A correlation function generator comprising:
means for generating a series of pairs of pulses where a first pulse in each pair is a reference pulse and a second pulse in each pair is a variable pulse, said series of pairs of pulses having progressively different time spacing between the reference and variable pulses in each pair and for presenting said pulse pairs serially at a first output terminal;
means, coupled to said first output terminal and including only a single function signal generator, responsive to said pairs of pulses for producing a corresponding series of pairs of function signals to be correlated and for presenting said function signal pairs serially at a second output terminal;
means coupled to said second output terminal for delaying one function signal from each of said pairs of function signals by a predetermined fixed amount;
and means for correlating, pair by pair, the delayed function signal and the other function signal of each pair to produce an output signal representative of the correlation function of said paired function signals.

References Cited
UNITED STATES PATENTS

| | | | |
|---|---|---|---|
| 2,643,819 | 6/1953 | Lee et al. | 235—181 |
| 2,958,039 | 10/1960 | Anderson. | |
| 3,014,181 | 12/1961 | Filipowsky | 328—63 |
| 3,043,515 | 7/1962 | Anderson et al. | 235—181 |
| 3,103,009 | 9/1963 | Baker | 235—181 X |

MALCOLM A. MORRISON, *Primary Examiner.*

J. RUGGIERO, *Assistant Examiner.*